(12) United States Patent
Kirjavainen

(10) Patent No.: US 6,793,854 B1
(45) Date of Patent: Sep. 21, 2004

(54) METHOD AND APPARATUS FOR MAKING PLASTIC FILM, AND PLASTIC FILM

(75) Inventor: Kari Kirjavainen, Tampere (FI)

(73) Assignee: Conenor Oy, Espoo (FI)

( * ) Notice: Subject to any disclaimer, the term of this patent is extended or adjusted under 35 U.S.C. 154(b) by 121 days.

(21) Appl. No.: 10/070,747

(22) PCT Filed: Sep. 8, 2000

(86) PCT No.: PCT/FI00/00762

§ 371 (c)(1),
(2), (4) Date: Mar. 11, 2002

(87) PCT Pub. No.: WO01/19596

PCT Pub. Date: Sep. 8, 2000

(30) Foreign Application Priority Data

Sep. 10, 1999 (FI) .................................................. 991934

(51) Int. Cl.[7] .......................... B29C 44/20; B29C 44/50; B29C 44/56
(52) U.S. Cl. ................ 264/45.9; 264/210.4; 264/210.6; 264/210.7; 264/555; 425/4 C; 425/72.1; 425/325; 425/378.1; 425/404
(58) Field of Search ............................... 264/45.9, 154, 264/210.4, 210.6, 210.7, 288.8, 555, 557; 425/4 C, 72.1, 325, 378.1, 404

(56) References Cited

U.S. PATENT DOCUMENTS

| | | |
|---|---|---|
| 3,244,781 A | 4/1966 | Covington, Jr. et al. |
| 3,634,564 A | 1/1972 | Okamoto et al. |
| 3,891,374 A | 6/1975 | Ninomiya et al. |
| 4,197,148 A * | 4/1980 | Shinomura ................... 156/79 |
| 4,814,124 A | 3/1989 | Aoyama et al. |
| 5,188,777 A | 2/1993 | Joesten et al. |
| 5,853,638 A * | 12/1998 | Han ........................... 264/154 |

FOREIGN PATENT DOCUMENTS

| | | | |
|---|---|---|---|
| DE | 3513526 A1 | 10/1986 | |
| EP | 0 300060 A1 | 1/1989 | |
| EP | 0 182 764 B1 | 3/1991 | |
| GB | 1384556 A | 2/1975 | |
| JP | 60257221 A * | 12/1985 | .............. 264/288.8 |
| WO | 99/51419 A1 | 10/1999 | |

OTHER PUBLICATIONS

Abstract of Japan 58057936 A (Apr. 1983).
Abstract of Japan 8039667 A (Feb. 1996).

* cited by examiner

Primary Examiner—Leo B. Tentoni
(74) Attorney, Agent, or Firm—Young & Thompson

(57) ABSTRACT

A method and an apparatus for making a plastic film, and to a plastic film wherein the method includes extruding a film from plastic material by an extruder and orientating the film after extrusion. Material is mixed into the plastic so that when the plastic film is stretched, cavitation bubbles are formed in the material particles mixed into the plastic. After orientation, gas is arranged to act on the plastic film under high pressure so that the gas diffuses in the cavitation bubbles and causes overpressure in them. Thus it is possible to make a thin foamed film with a foaming degree of over 70%.

16 Claims, 4 Drawing Sheets

METHOD AND APPARATUS FOR MAKING PLASTIC FILM, AND PLASTIC FILM

BACKGROUND OF THE INVENTION

The invention relates to a method for making a plastic film, the method comprising extruding a plastic film, mixing material into the plastic of the plastic film before extrusion, the material causing cavitation bubbles in the plastic film to be stretched, and orientating the plastic film by stretching after extrusion.

The invention also relates to an apparatus for making a plastic film, the apparatus comprising an extruder and at least one orientation device for orientating the extruded film.

The invention further relates to a plastic film which comprises bubbles with the maximum diameter of about 100 micrometers and the maximum height of about 10 micrometers, in which case the plastic film has been subjected to stretching and material which causes cavitation bubbles in the stretched plastic film has been mixed into the plastic of the plastic film.

Making a plastic film by extruding it and then orientating it is known e.g. from U.S. Pat. Nos. 3,244,781 and 3,891,374. It is, however, difficult to make thin and in particular thin foamed films using these solutions.

EP publication no. 0,182,764 discloses a thin polypropylene film which contains wide and flat disc-like bubbles, which are about 80 micrometers in length and about 50 micrometers in width. The film is produced by extruding material which has been foamed chemically or by means of gas and by orientating the extruded material biaxially. The result is a very versatile plastic film. However, the foaming degree of the film is less than 50%, which is why the properties of the film are not good enough for all purposes.

U.S. Pat. No. 3,634,564 discloses orientation of a foamed film to obtain a fiberized film. The foamed film is formed by mixing a foam forming substance into the plastic material. The mixture is extruded, which yields a foamed film, which is stretched. The bubbles of the film obtained are, however, rather large.

U.S. Pat. No. 4,814,124 discloses a film made of polyolefin and a filler which is stretched to obtain a gas permeable porous film. However, the foaming degree of such a film is not sufficiently good, nor are the mechanical properties of such a porous film sufficiently good for acoustic applications, for example.

Furthermore, it is not possible to produce thin films of polymethylpentene or cyclic olefin copolymer using the prior art solutions.

SUMMARY OF THE INVENTION

The object of this invention is to provide a very good and thin foamed plastic film and a simple and reliable method and apparatus for making said plastic film.

The method of the invention is characterized in that after orientation the plastic film is subjected to pressurized gas so that the gas diffuses in cavitation bubbles, and thus bubbles containing gas are formed in the plastic film.

The apparatus of the invention is characterized in that the apparatus comprises gas supply means arranged after at least one orientation device for feeding pressurized gas into the plastic film after orientation by stretching so that the fed gas diffuses in the cavitation bubbles that are formed in the plastic film during stretching, and thus bubbles containing gas are formed in the plastic film.

The plastic film of the invention is characterized in that the plastic film is subjected to the pressure of pressurized gas after stretching so that the bubbles contain said gas and the foaming degree of the plastic film is over 70%.

The basic idea of the invention is that a film is extruded from plastic material by means of an extruder and material has been mixed into the plastic so that when the plastic is stretched cavitation bubbles are formed in the material particles mixed into the plastic. The film is orientated by stretching and after that gas is fed into the film under high pressure so that the gas diffuses in the cavitation bubbles and causes overpressure in them. The idea of a preferred embodiment is that after the first orientation and feeding of gas the plastic film is orientated by stretching it in the direction substantially perpendicular to the first orientation direction, and thus the overpressure is released in the cavitation bubbles and the bubbles expand.

An advantage of the invention is that very thin films with a foaming degree of about 70 to 90% can be provided in a relatively simple manner. An advantage of the high foaming degree is that the electric and mechanical properties of the film are very good. Since the film becomes thinner as it is orientated by stretching, gas diffuses in the orientated film substantially faster than in an non-orientated film, i.e. gas can be fed into the film particularly efficiently by not feeding gas which acts on the film until after orientation. A further advantage is that the method and apparatus can be used for making a film for example of polymethylpentene or cyclic olefin copolymer or a combination thereof.

BRIEF DESCRIPTION OF THE DRAWINGS

The invention will be described in greater detail in the following drawings, in which.

DETAILED DESCRIPTION OF THE PREFERRED EMBODIMENTS

Figure 1:
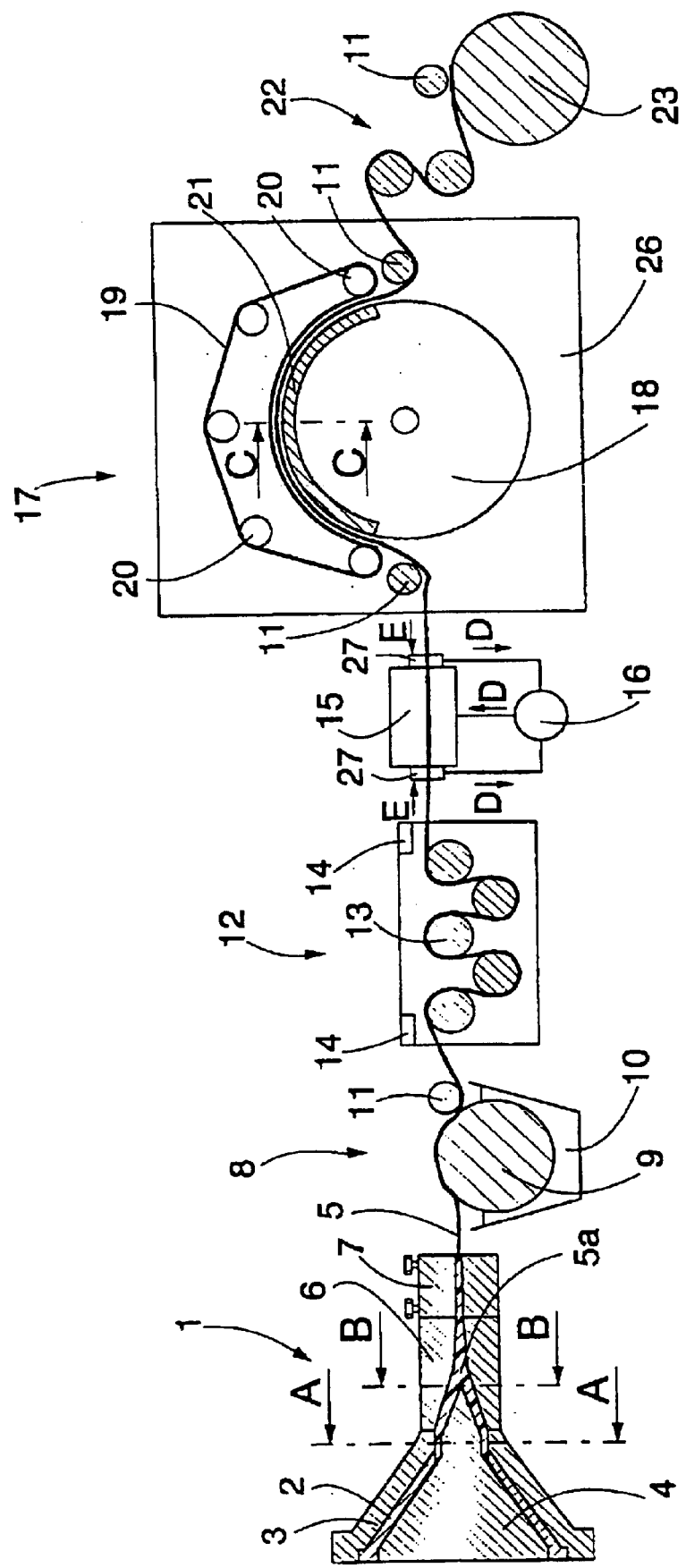
FIG. 1 is a schematic cross-sectional side view of an apparatus of the invention.

FIG. 1 is a side view of an apparatus according to the invention. The apparatus comprises an extruder 1. The extruder may be for example conical, i.e. it comprises a cone-shaped rotor 2, outside of which there is an outer stator 3 whose surface at least on the rotor 2 side is cone-shaped, and inside the rotor there is an inner stator 4 whose surface at least on the rotor 2 side is cone-shaped. When the rotor 2 rotates, it extrudes material which is between the rotor 2 and the stators 3 and 4 from the extruder 1 in a manner known per se. For the sake of clarity the figures do not illustrate e.g. the rotating means of the rotor or the feeding devices for feeding the material to be extruded into the extruder 1. The extruder 1 may comprise more than one rotor 2 and more than two stators 3 and 4. In that case the extruder 1 can be used for extruding multilayer products. The solution with one rotor 2 and two stators 3 and 4 can be used for making two-layer products. The end portion of the inner stator 4 is wide and tapers in the vertical direction so that together with the nozzle 6 it forms a relatively flat and wide gap through which plastic 5a is extruded. After the nozzle 6 there is a calibration piece 7 whose nuts are used for adjusting the height of the gap, which allows to define the thickness of the plastic film 5 to be obtained from the extruder 1.

After the extruder 1 the plastic film 5 is cooled by a cooling device 8. The cooling device 8 may comprise e.g. a cooling roll 9, which is arranged in a cooling tank 10 containing a cooling medium, e.g. water. The plastic film 5 is arranged to be pressed against the cooling roll 9. The apparatus according to FIG. 1 uses auxiliary rolls 11 for guiding the plastic film 5 at several points.

After cooling the plastic film 5 is guided to a machine direction orientation device 12. The machine direction orientation device 12 comprises orientation rolls 13 whose velocities are adjusted so that they can be used for stretching the plastic film 5 and thus for orientation in the machine direction. If desired, the velocity of each orientation roll 13 can be adjusted separately. The machine direction orientation device 12 may also comprise heating means 14, such as radiation heaters, for heating the plastic film 5 in a manner known per se. The orientation rolls 13 can also be used for heating the plastic film by supplying a heating medium, such as heated oil, to the orientation rolls 13 so that the orientation rolls 13 become warm. If desired, the temperature of each orientation roll 13 can be adjusted separately.

After the machine direction orientation device 12 the plastic film 5 is supplied to a discharge chamber 15. Pressurized gas, preferably air, is fed into the discharge chamber 15 by a pump 16. Instead of air, nitrogen or another gas or gas mixture, for instance, may be used as the gas to be fed. The gas to be fed may also be selected according to the desired electric properties. For example, in respect of the dielectric strength of the product it would be advisable to use sulphurhexafluoride $SF_6$ and in respect of chargeability e.g. argon. A sealing chamber 27 is provided at the forward end and at the tail end of the discharge chamber 15. Gas flowing from the sealing chamber 27 can be sucked by the pump 16 and supplied further to the discharge chamber 15 as shown with arrows D. The pump 16 is used for increasing the pressure in the discharge chamber 15 to the desired level. The pressure in the discharge chamber 15 is relatively small compared to the typical foaming methods. The pressure in the discharge chamber 15 is preferably about 10 bars, but it may vary between 3 and 20 bars, for instance. When the pressure in the discharge chamber 15 is increased with the pump 16, the temperature also rises as gas is compressed in the gas chamber 15. This heat can be utilized for heating the plastic film 5. The discharge chamber 15 may also be provided e.g. with heating resistors which are arranged to heat the plastic film 5. Thus the discharge chamber 15 can be used both for feeding gas into the plastic film and for heating the plastic film 5 for orientation in the cross-direction. When air is used as the pressurized gas, additional air can be can be sucked into the system from outside the apparatus through the sealing chambers 27 as shown with arrows E.

Suitable material, such as calcium carbonate particles, is mixed into the plastic 5a of the plastic film 5, and due to the influence of the particles the joint surfaces of the plastic molecules and the mixed material are torn during orientation, and thus cavitation bubbles are formed. When the plastic film 5 is subjected to the pressure of pressurized gas after orientation, the gas diffuses in the cavitation bubbles and causes overpressure in the bubbles. In the discharge chamber 15 the pressurized gas can act on both sides of the plastic film 5, and thus gas bubbles are formed evenly in the plastic film 5.

Figure 2:
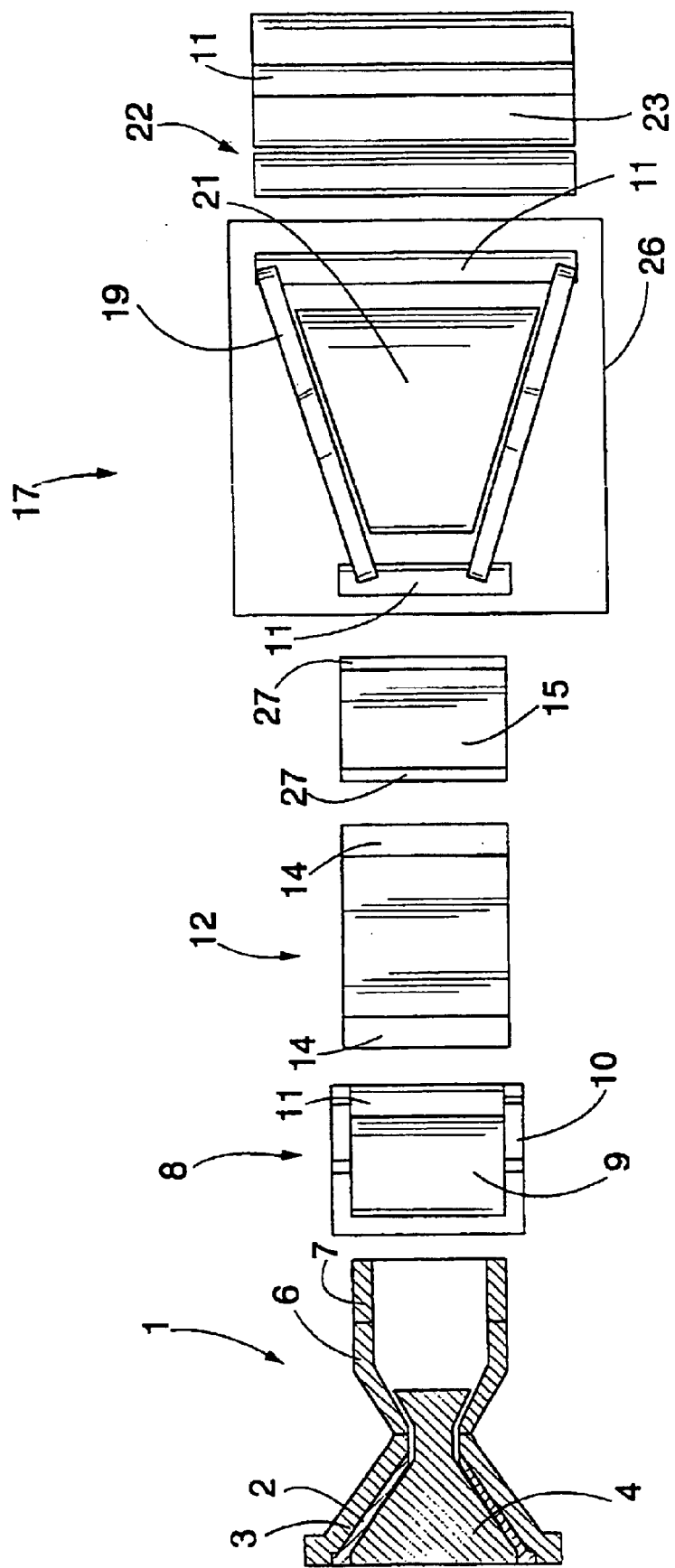
FIG. 2 is a partially cross-sectional top view of the apparatus illustrated in FIG. 1.

After the machine direction orientation device 12 and the discharge chamber 15 the plastic film 5 is supplied to a cross-direction orientation device 17. In the cross-direction orientation device 17 the plastic film 5 is stretched in the cross-direction, i.e. orientation is performed in the direction substantially perpendicular to the direction of the orientation performed in the machine direction device 12. Due to the overpressure of the gas in the bubbles and cross-direction stretching the bubbles can grow sideways and in the vertical direction in the cross-direction orientation device 17. In that case the foaming degree of the film is for example about 70 to 90%. The foaming degree can be adjusted simply by adjusting the pressure of the gas to be fed into the discharge chamber 15. The cross-direction orientation device 17 comprises two orientation wheels 18, and an orientation band 19 is arranged against both of the wheels. The orientation band 19 is an endless band which is guided by means of band guide rolls 20. The orientation band 19 presses the edges of the plastic film 5 firmly and evenly between the orientation wheel 18 and the orientation band 19 substantially along the whole travel the cross-direction orientation device 17, in which case the film is not subjected to varying pressure stress or tensile strain, and thus the plastic film stretches sideways without tearing. In FIG. 1 the plastic film 5, orientation wheel 18 and orientation band 19 are illustrated at a distance from one another for the sake of clarity, but in reality these parts are pressed firmly against one another. The orientation wheels 18 and the orientation bands 19 are arranged so that in the direction of the plastic film they are further away from one another at the end than at the beginning, as is illustrated in FIG. 2, and thus the cross-direction orientation device 17 stretches and simultaneously orientates the plastic film 5 in the cross-direction. The deviation of the angle between the orientation wheels 18 and the orientation bands 19 from the machine direction can be adjusted according to the desired degree of cross-direction stretching. One or more band guide rolls 20 can be arranged to be rotated by the rotating means. Since the bands 19 are firmly pressed against the orientation wheels 18, the orientation wheels 18 do not necessarily need rotating means but may rotate freely. For the sake of clarity the enclosed figures do not illustrate rotating means or other actuators of the apparatus. A curved support plate 21, which has substantially the same shape as the circumference of the orientation wheels 18, is arranged between the orientation wheels 18 to support the plastic film 5.

The cross-direction orientation device 17 can be placed in a casing 26 of its own. If desired, the casing 26 can be provided with heaters known per se, such as radiation heaters, to heat the plastic film 5.

After the cross-direction orientation device 17 the plastic film 5 is led to a relaxation unit 22. In the relaxation unit 22 the plastic film 5 is relaxed, and thus the plastic film shrinks a bit in a manner known per se. Finally, the plastic film 5 is wound on a reel 23.

FIG. 2 is a cross-sectional top view of the apparatus of the invention at the extruder 1. For the sake of clarity FIG. 2 does not illustrate the plastic film 5 or the support structures of the apparatus onto which the rolls, reels and plates of the apparatus are attached, for instance.

Figure 3:
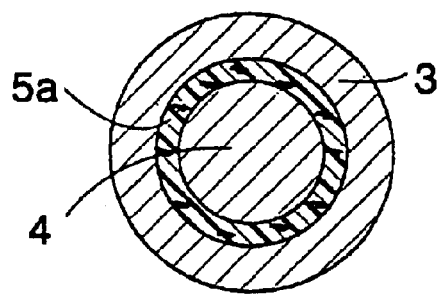
FIG. 3 is a cross-sectional view of a detail of the apparatus illustrated in FIG. 1 along line A—A.

FIG. 3 is a cross-sectional view of a detail of the extruder 1 along line A—A of FIG 1. Here both the outer stator and the inner stator 4 are round in cross-section. Thus the plastic material 5a is also in an annular feeding channel.

Figure 4:
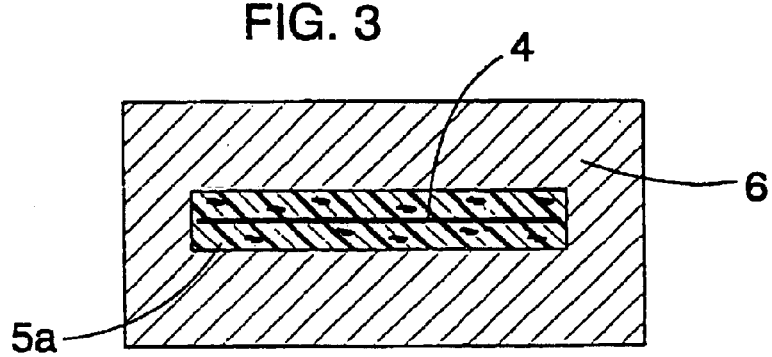
FIG. 4 is a cross-sectional view of a detail of the apparatus illustrated in FIG. 1 along line B—B.

FIG. 4 is a cross-sectional view of a detail of the extruder 1 along line B—B of FIG. 1. Here we see the wide tip of the inner stator 4 and the shape of nozzle 6 which extrude the plastic 5a into the wide and flat gap, and thus a flat plastic film 5 is formed from the plastic 5a.

Figure 5:
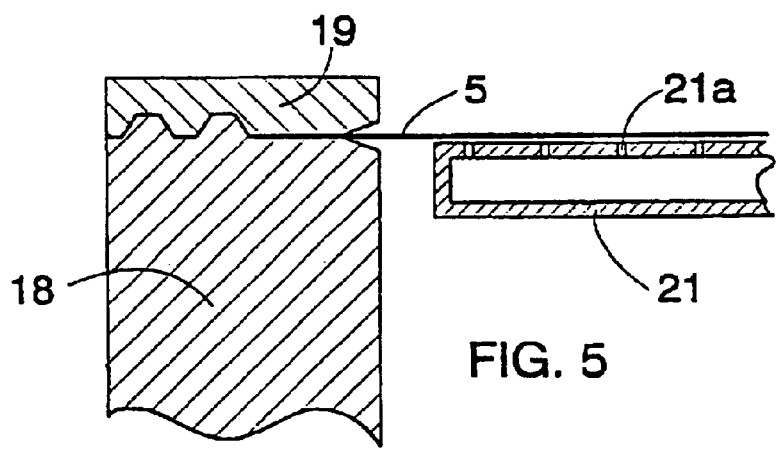
FIG. 5 is a cross-sectional view of a detail of the apparatus illustrated in FIG. 1 along line C—C.

FIG. 5 is a cross-sectional view of a detail of the cross-direction orientation device 17 along line C—C of FIG. 1. It is seen in FIG. 5 how the orientation wheel and the orientation band are pushed against each other and press the plastic film 5 between each other. The surface of the support plate 21 against the plastic film 5 may be heated e.g. by providing it with heating resistors, and thus the plastic film 5 slides along the sliding surface in question very easily. Furthermore, propellant, such as air, can be blown from the support plate 21 through the gaps 21a, in which case the propellant flowing through the gaps 21a provides a sliding bearing between the support plate 21 and the plastic film 5. The gas in question may be heated, if desired, and thus the sliding surface of the support plate 21 and the plastic film 5 are heated with the propellant flowing through the gaps 21a.

Figure 6:
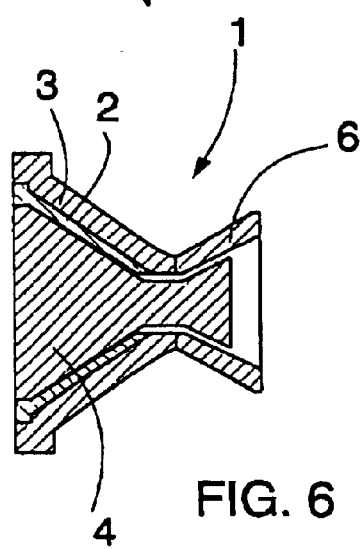
FIG. 6 is a schematic cross-sectional top view of an extruder used in the apparatus of the invention.

FIG. 6 illustrates an extruder 1 used in the apparatus according to the invention. The nozzle 6 of the extruder 1 widens up to the end portion of the extruder, i.e. up to the point where the plastic film 5 exits from the extruder 1. In the nozzle 6 of the extruder 1 the plastic 5a is thus all the time subjected to cross-direction orientation in addition to longitudinal orientation, which makes it considerably easier to orientate the plastic film in the cross-direction at a later processing stage.

Figure 7A:
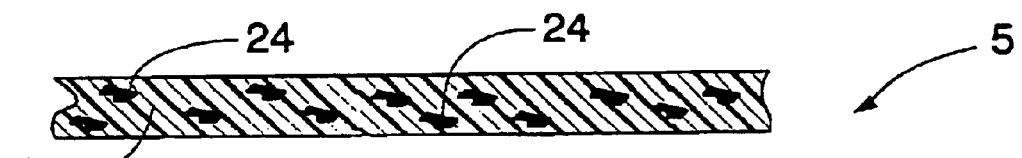
FIG. 7a is a. cross-sectional side view of a plastic film extruded by the apparatus of the invention before orientation of the film.

FIG. 7a is a side view of the plastic film 5. Before extrusion calcium carbonate particles 24 have been mixed into the plastic 5a. Instead of calcium carbonate particles 24 some other material may also be mixed into the plastic 5a. The material should be such that it causes the joint surface of the plastic molecules and the material mixed into the plastic 5a to tear when the plastic film 5 is stretched so that cavitation bubbles are formed where the joint surfaces are torn. Thus some oily substance, such as silicone oil or paraffin oil, can be mixed into the plastic 5a. The particles mixed into the plastic 5a may cause spot-like asymmetry e.g. in the electric field in the plastic 5a, whereas the oily substance mixed into the plastic does not substantially worsen the electric properties of the plastic. It is also possible to mix a substance having a melting point lower than the orientation temperature of the plastic 5a, such as paraffin, into the plastic, in which case the substance melts when the plastic 5a is orientated. The plastic 5a may be made e.g. from polypropylene PP, polymethylpentene TPX or cyclic olefin copolymer COC. The heat resistance of polymethylpentene and cyclic olefin copolymer is better than that of polypropylene, for example. Electric charges also remain in polymethylpentene and cyclic olefin copolymer better than in polypropylene at high temperatures. Processing of polymethylpentene and cyclic olefin copolymer is very difficult but by the method and apparatus of the invention a very thin and foamed plastic film 5 can be made of them or of their mixtures. In the situation illustrated in FIG. 7a the plastic film 5 has not been stretched yet.

Figure 7B:
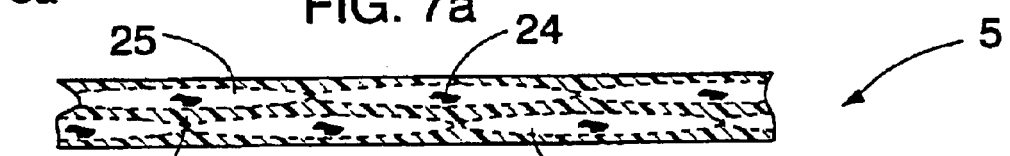
FIG. 7b is a cross-sectional side view of the plastic film extruded by the apparatus of the invention after longitudinal orientation.
Figure 7C:
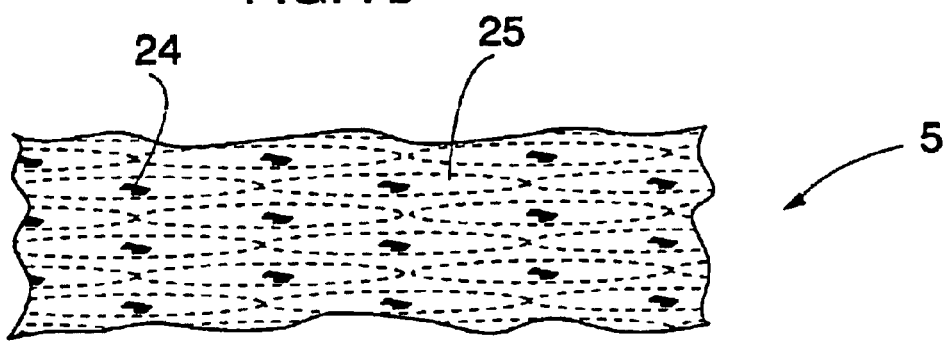
FIG. 7c is a schematic top view of the plastic film illustrated in FIG. 7b.

FIGS. 7b and 7c illustrate the plastic film 5 after it has been stretched in the machine direction orientation device 12 and the pressure of pressurized gas has already acted on the plastic film 5. In that case gas has diffused in the cavitation bubbles and caused overpressure in them, as a result of which bubbles 25 containing gas have formed. In the situation illustrated in FIGS. 7b and 7c the plastic film 5 has been subjected only to machine direction stretching, and consequently the bubbles 25 are long, flat and narrow.

Figure 7D:
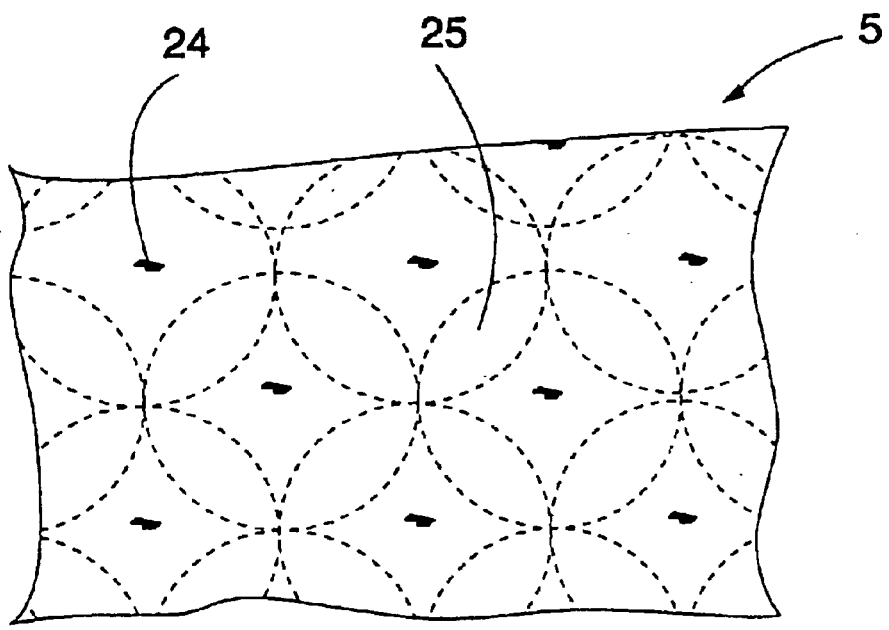
FIG. 7d is a schematic top view of the plastic film made by the apparatus of the invention after longitudinal and cross-direction orientations.

FIG. 7d illustrates a situation in which the plastic film 5 has also been stretched in the cross-direction by means of the cross-direction orientation device 17. The gas that was overpressurized in the bubbles 25 in the situation illustrated in FIGS. 7b and 7c has released in the lateral direction in the cross-direction orientation device 17. Thus the bubbles 25 are now also wide. In addition, the bubbles 25 are flat, i.e. they are plate-shaped or disc-like. The bubbles 25 are relatively small, their diameter is at most about 100 micrometers and their height is typically less than one micrometer, at most about 10 micrometers. However, the method and apparatus provide very thin plastic films 5. The thickness of the plastic films 5 may be only 10 micrometers.

The plastic film 5 can be used for several purposes in a manner known per se. At least one surface of the plastic film 5 can be provided with an electrically conductive coating, for instance, in which case the solution can be used e.g. as a microphone or loudspeaker in several acoustic applications, including sound attenuation. The plastic film 5 may also be provided with a permanent electric charge using e.g. the corona charge method.

The drawings and the related description are only intended to illustrate the inventive concept. The details of the invention may vary within the scope of the claims. Thus the orientation directions of the plastic film 5 and the order of orientations in different directions may vary. According to the invention, the simplest way to make a plastic film is to orientate the plastic film in the machine direction first and thereafter in the direction transverse to the machine direction.

What is claimed is:

1. A method for making a plastic film, the method comprising mixing cavitation material into plastic material which causes cavitation bubbles in a plastic film to be stretched;

extruding the plastic into a film;

orientating the plastic film by stretching after extrusion; and after orientation subjecting the plastic film to pressurized gas so that the gas diffuses in the cavitation bubbles, and thus forming in the plastic film bubbles containing gas.

2. A method according to claim 1, comprising arranging gas to act on the plastic film after a first orientation stage and thereafter subjecting the plastic film to a second orientation which is substantially perpendicular to the first orientation so that the bubbles containing gas expand due to the influence of the second orientation and the gas.

3. A method according to claim 2, wherein at the first orientation stage the plastic film is orientated in the machine direction and at the second orientation stage the plastic film is orientated in the direction substantially transverse to the machine direction.

4. A method according to claim 1, wherein the pressure of the gas acting on the plastic film is over 3 bars.

5. A method according to claim 1, wherein before extrusion an oily substance or a substance having a melting point lower than the orientation temperature of the plastic is mixed into the plastic.

6. A method according to claim 1, wherein the plastic film is heated at the same time as gas is fed.

7. A method according to claim 6, wherein the pressure of the pressurized gas is increased so that the temperature of the gas rises, and thus the pressurized gas is used for heating the plastic film.

8. A method according to claim 1, wherein pressurized gas is fed by a discharge chamber, a sealing chamber is provided at least at one end of the discharge chamber, and gas flowing into the sealing chamber is sucked and supplied back to the discharge chamber.

9. An apparatus for making a plastic film, the apparatus comprising an extruder, at least one orientation device for orientating an extruded film by stretching and gas supply means comprising a discharge chamber arranged after the at least one orientation device for feeding pressurized gas into the plastic film after orientation by stretching so that the fed gas diffuses in the cavitation bubbles that are formed in the plastic film during stretching, and thus bubbles containing gas being formed in the plastic film.

10. An apparatus according to claim 9, wherein the discharge chamber is arranged after a first orientation device and the apparatus further comprises a second orientation device after the first orientation device in the direction of the plastic film, the second orientation device being arranged to orientate the plastic film in the direction substantially transverse to the orientation direction of the first orientation device so that the bubbles containing gas expand due to the influence of the second orientation device and the gas.

11. An apparatus according to claim 10, wherein the first orientation device is arranged to orientate the plastic film in the machine direction and the second orientation device is arranged to orientate the plastic film in the direction substantially transverse to the machine direction.

12. An apparatus according to claim 9, wherein the discharge chamber is provided with means for heating the plastic film.

13. An apparatus according to claim 12, wherein the apparatus comprises means for increasing the pressure of pressurized gas so that the gas temperature rises whereby the gas heats the plastic film.

14. An apparatus according to claim 9, wherein a sealing chamber is provided at least at one end of the discharge chamber.

15. An apparatus according to claim 14, wherein the gas supply means comprise a pump which is arranged to suck gas from the sealing chamber and means for supplying the gas sucked from the sealing chamber into the discharge chamber.

16. An apparatus according to claim 15, wherein the pump is arranged to suck additional air through the sealing chamber.

* * * * *